May 8, 1956  T. W. WILLEMSE  2,745,052
DEVICE FOR CHARGING A CAPACITOR
Filed Aug. 4, 1953
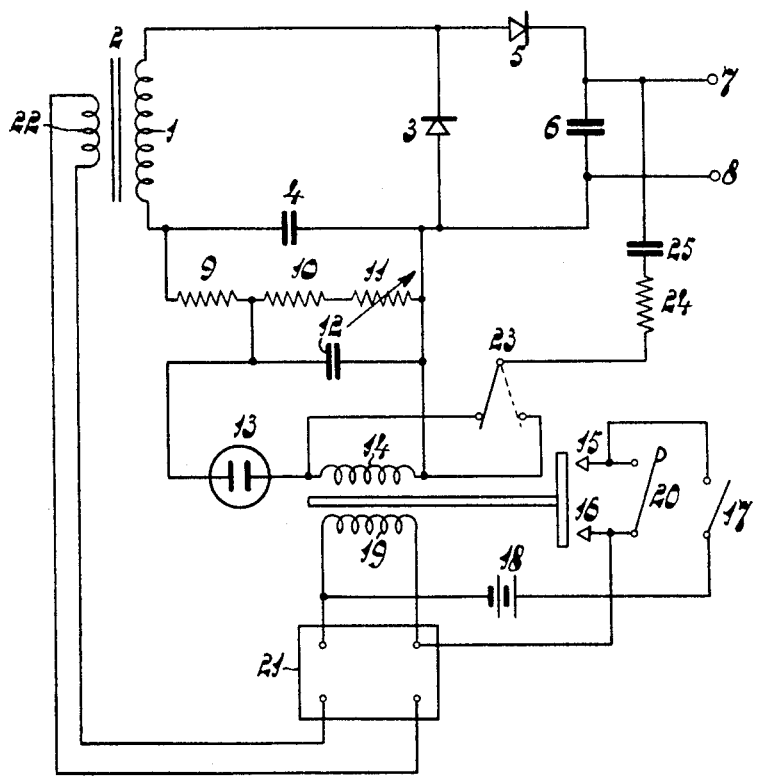
INVENTOR
THEO WILLEM WILLEMSE
BY
AGENT United States Patent Office 2,745,052
Patented May 8, 1956

2,745,052

DEVICE FOR CHARGING A CAPACITOR

Theo Willem Willemse, Eindhoven, Netherlands, assignor to Hartford National Bank and Trust Company, Hartford, Conn., as trustee Application August 4, 1953, Serial No. 372,249

Claims priority, application Netherlands September 26, 1952

2 Claims. (Cl. 320—1)

This invention relates to devices for charging capacitors from a source of alternating current via a rectifier, which device comprises voltage sensitive means causing the source of charging current to be cut off when the capacitor attains a given voltage.

Besides in welding circuits, these devices are widely used inter alia in the field of photography, where the capacitor becomes discharged via a gas-discharge lamp illuminating the object to be photographed.

In known devices of said type, the voltage sensitive means is connected in the form of a resistance voltage divider in parallel with the capacitor, so that the capacitor, after having been charged, becomes uselessly discharged by the current-consuming voltage divider. Consequently, the capacitor must be used either instantly on attaining the desired voltage or must again be charged after some time.

It has been sought to avoid this disadvantage by means interrupting the current-consuming voltage divider, connected in parallel with the capacitor, on switching off the source of charging current. During this interruption the full capacitor voltage is set up between the interrupter contacts, which may entail structural difficulties, notably on the occurrence of high voltages, for example in excess of 1000 v.

The present invention has for its object to avoid interruption of the voltage sensitive means and to prevent the charged capacitor from becoming discharged by the voltage sensitive means.

According to the invention an auxiliary capacitor is connected in series with the capacitor (main capacitor) and the rectifier (main rectifier), and an auxiliary rectifier is connected in parallel with the series-connection of the main capacitor and the main rectifier, the pass-direction of said auxiliary rectifier in the circuit shunting the main capacitor and comprising the series-connected rectifiers being the same as that of the main rectifier, and the voltage sensitive means being connected to either of the rectifier, if desired, via the source of alternating current. The auxiliary capacitor and the auxiliary rectifier are elements of a voltage doubling circuit known per se. The main capacitor is prevented from becoming discharged via the voltage sensitive means by the presence of the rectifier to which the voltage sensitive means is not connected.

The voltage sensitive means may have connected to it a circuit comprising a coil of a relay controlling the supply of current to the charging device, a point, preferably one end, of this coil being connected to a terminal of the main capacitor. Without having to complete a voltage sensitive means, since the latter is not interrupted, the device permits the charging device, after the useful discharge of the main capacitor, to be automatically brought again into the charging condition by connecting another point, preferably the other end of the relay coil, via the series-connection of a further auxiliary capacitor and a resistor to the other terminal of the main capacitor.

The single figure of the accompanying drawing shows a circuit diagram of a charging device according to applicant's invention.

In order that the invention may be readily carried into effect it will now be described in detail with reference to the accompanying drawing, given by way of example, in which the reference numeral 1 denotes a source of alternating current, i. e. the secondary winding of a transformer 2, a capacitor 4 of approximately 0.05 microfarad being connected in series with a rectifier 3 to the winding 1. The rectifier 3 is shunted by the series-connection of a rectifier 5 and a capacitor 6 of approximately 6 microfarads. In the circuit comprising the elements 3, 5, 6, the pass-direction of the rectifiers is the same. The capacitor 4 is charged via the rectifier 3 during a given half cycle, the capacitor 6 being charged via the capacitor 4 and the rectifier 5 during the next half cycle. The capacitor 6 is the main capacitor which is connected to the terminals 7, 8 to which may be connected a load, for example a gas-discharge lamp. The rectifier 3 is an auxiliary rectifier, the capacitor 4 is an auxiliary capacitor or voltage doubling capacitor. With the use of the elements 3 and 4 the capacitor 6 can be charged to double the peak voltage of the winding 1. The elements are so proportioned as to charge the capacitor 6 to approximately 4000 v.

From measurements it has been found that the direct voltage component of the voltage across the auxiliary rectifier 3 or across the main rectifier 5 and also across the elements 3+1 (i. e. the direct voltage across the auxiliary capacitor 4) or across the elements 5+1 (i. e. the difference between the direct voltage across the main capacitor 6 and that across the auxiliary capacitor 4) is substantially proportional to the voltage across the main capacitor 6 and, more particularly, is approximately one half thereof.

Thus, by way of example, the auxiliary capacitor 4 is connected in parallel with a voltage sensitive means in the form of a voltage divider comprising the series-connection of resistors 9, 10 and 11 whose values are approximately 20, 15 and 5 megohms, respectively. The resistor 11 is a variable resistor.

To the series-connection of the resistors 10 and 11 is connected a capacitor 12 of approximately 0.05 microfarad, which capacitor is connected to the series-connection of a spark gap 13 and a relay coil 14. This coil controls the making and breaking of contacts 15 and 16 of a relay in accordance with the direction of the current through coil 14. If the voltage of the capacitor 12, which voltage is adjustable by means of the variable resistor 11, attains the breakdown voltage of approximately 1000 v. of the spark gap 13, this spark gap becomes conductive and the coil 14 breaks the relay contacts 15 and 16.

The contact 15 is connected via a main switch 17 to one terminal of a direct current battery 18 of approximately 6 v., and the contact 16 is connected via a further relay coil 19 to the other terminal of said battery. The contacts 15 and 16 may alternatively be connected by means of a push-button switch 20. The relay coil 19 is connected to the input terminals of a vibrator 21, to the output terminals of which the primary coil 22 of transformer 2 is connected.

With closed main switch 17, the vibrator 21 is connected to the battery by depressing the push-button switch 20, thus initiating the charging operation of the main capacitor 6 via the transformer 2 and the elements 3, 4 and 5. The relay coil 19 connected to the input terminals of the vibrator causes direct engagement of the contacts 15 and 16, hence the vibrator remains connected even after releasing the push-button switch 20. As soon as the spark gap 13 breaks down, the relay coil 14 breaks the contacts 15 and 16 with the result that the battery 18 and the transformer 2 supplied by this battery via the vibrator 21 are disconnected.

The charged capacitor 6 is protected by the main rectifier 5 against undue discharge through any element of the charging device. Solely the small voltage doubling capacitor 4 becomes discharged by the voltage divider 9, 10 and 11 without, however, withdrawing energy from the main capacitor.

Without employing the push button switch 20, the charging device, upon a discharge of the main capacitor 6, may be automatically made operative by connecting the end of the relay coil 14, which end is connected to the spark gap 13 to the terminal 7 of the main capacitor 6 by way of a change over switch 23, a resistor 24 and a capacitor 25, the capacitor 25 then being connected in parallel with the main capacitor 6 via the resistor 24 and the relay coil 14. A discharge of the capacitor 6 via the terminals 7 and 8 consequently involves a discharge of the capacitor 25, with the result that a current impulse of such direction is produced in the relay coil 14 as to cause the contacts 15 and 16 to engage each other. The resistor 24 serves for decoupling the circuit of the capacitor 25 from other circuits of the charging device. In the position of the switch 23 shown in broken lines, the coil 14 is no longer connected in the circuit of the capacitor 25.

What is claimed is:

1. A circuit-arrangement comprising a main capacitor, a main rectifier connected in series with said capacitor, means to apply an alternating voltage across the series combination of said capacitor and rectifier to charge said capacitor, an auxiliary rectifier connected in parallel with said series combination, the direction of conduction of said auxiliary rectifier in the circuit formed by said auxiliary rectifier and said series combination beng the same as that of said main rectifier, an auxiliary capacitor connected in series with said series combination, and circuit means including voltage sensitive means coupled to one of said rectifiers to render said voltage applying means inoperative when said main capacitor attains a predetermined value.

2. A circuit-arrangement as set forth in claim 1, wherein said circuit means further includes a relay having a coil which selectively renders said voltage applying means operative when said main capacitor is being discharged and inoperative when said main capacitor attains a predetermined value, a resistor, and a second auxiliary capacitor connected in series with said resistor, one end of said coil being connected to one terminal of said main capacitor, the other end of said coil being connected via said resistor and second auxiliary capacitor to the other terminal of said main capacitor.

References Cited in the file of this patent
UNITED STATES PATENTS 2,358,796     Edgerton _____ Sept. 26, 1944